United States Patent [19]
Yamanaka et al.

[11] Patent Number: 5,860,130
[45] Date of Patent: Jan. 12, 1999

[54] MEMORY INTERFACE APPARATUS INCLUDING AN ADDRESS MODIFICATION UNIT HAVING AN OFFSET TABLE FOR PRESTORING A PLURALITY OF OFFSETS

[75] Inventors: Hidekazu Yamanaka; Tsuyoshi Muramatsu, both of Nara, Japan

[73] Assignee: Sharp Kabushiki Kaisha, Osaka, Japan

[21] Appl. No.: 636,579

[22] Filed: Apr. 23, 1996

[30] Foreign Application Priority Data

May 29, 1995 [JP] Japan ..................................... 7-130388

[51] Int. Cl.[6] ....................................................... G06F 9/28
[52] U.S. Cl. ........................ 711/169; 711/219; 711/202; 711/203; 711/169
[58] Field of Search .................... 711/202, 220, 711/219, 215, 203, 170, 171

[56] References Cited

U.S. PATENT DOCUMENTS

| | | | |
|---|---|---|---|
| 5,502,834 | 3/1996 | Arata et al. | 711/169 |
| 5,526,502 | 6/1996 | Yoshida et al. | 711/202 |

FOREIGN PATENT DOCUMENTS

| | | | |
|---|---|---|---|
| 62-74408 | 9/1994 | Japan | G06F 12/00 |

*Primary Examiner*—Eddie P. Chan
*Assistant Examiner*—Than V. Nguyen

[57] ABSTRACT

A memory interface apparatus includes a plurality of data memories MEMs, and address modification units AMDs and memory access units I/Fs respectively corresponding to the plurality of data memories MEMs. Each address modification unit AMD has an offset table OFT for pre-storing a plurality of offsets, reads an offset from the table OFT based on received second data D2, modifies an address indicated by a received generation number GN using the read offset, and applies a resultant address to a corresponding memory access unit I/F. Each memory access unit I/F accesses a memory MEM based on the applied address, according to a received operation code C. Each result of access is applied in parallel to an operation unit ALU, which in turn performs operation of the applied result according to an operation code C. Thus, operation processing which compounds access to a memory can be carried out, utilizing parallelism in processing sufficiently.

21 Claims, 14 Drawing Sheets out=a+b+c+d+e

OFFSET:(FIELD,LINE,PIXEL)

FIG.5A
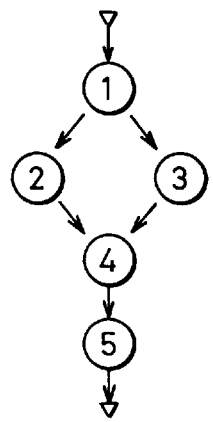
FIG.5B
| Node | dst. | src.operation | offset($In_2$) |
|---|---|---|---|
| 1. | $M(0,0,0)$, Out $\Leftarrow$ $In_1$ | | (0,0,0) |
| 2. | Out | $\Leftarrow M(0,-2,0)+M(0,0,0)$ | (-2,0,0) |
| 3. | Out | $\Leftarrow M(0,-1,-1)+M(0,-1,1)$ | (-1,-1,1) |
| 4. | Out | $\Leftarrow In_1+In_2$ | --- |
| 5. | Out | $\Leftarrow In_1+M(0,-1,0)$ | (0,-1,0) |
FIG.5C
FIG.5D
| Node | dst. | src.operation | offset($In_2$) |
|---|---|---|---|
| 1. | $M(0,0,0)$, Out $\Leftarrow$ $In_1$ | | (0,0,0) |
| 2. | Out | $\Leftarrow M(0,-2,0)+M(0,-1,-1)$ $+M(0,-1,0)+M(0,-1,1)$ $+M(0,0,0)$ | tbl_addr |
FIG.5E
| Address | $AMD_1$ | $AMD_2$ | $AMD_3$ | $AMD_4$ | $AMD_5$ |
|---|---|---|---|---|---|
| ⋮ | ⋮ | ⋮ | ⋮ | ⋮ | ⋮ |
| tbl_addr | (0,-2,0) | (0,-1,-1) | (0,-1,0) | (0,-1,1) | (0,0,0) |
| ⋮ | ⋮ | ⋮ | ⋮ | ⋮ | ⋮ |

FIG.6A
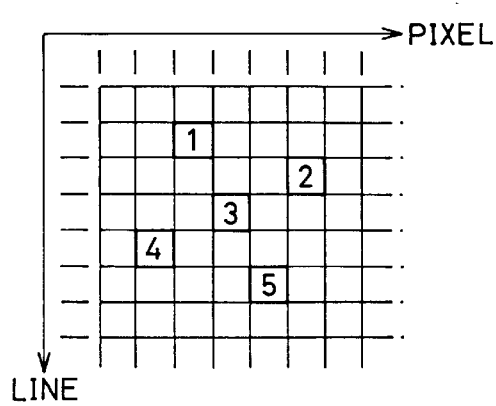
FIG.6B
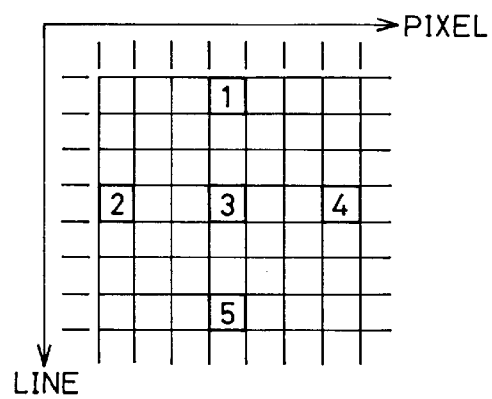
FIG.6C
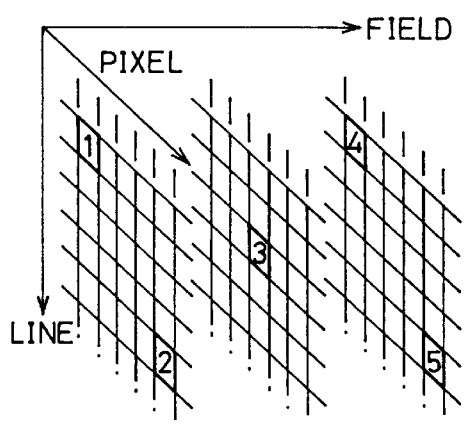
FIG.6D
| CASE \ OFFSET | AMD(1) | AMD(2) | AMD(3) | AMD(4) | AMD(5) |
|---|---|---|---|---|---|
| FIG.6A | ( 0,-4,-2) | ( 0,-3, 1) | ( 0,-2,-1) | ( 0,-1,-3) | ( 0, 0, 0) |
| FIG.6B | ( 0,-6, 0) | ( 0,-3,-3) | ( 0,-3, 0) | ( 0,-3, 3) | ( 0, 0, 0) |
| FIG.6C | (-2,-4,-4) | (-2, 0, 0) | (-1,-2,-2) | ( 0,-4,-4) | ( 0, 0, 0) |

MEMORY INTERFACE APPARATUS INCLUDING AN ADDRESS MODIFICATION UNIT HAVING AN OFFSET TABLE FOR PRESTORING A PLURALITY OF OFFSETS

BACKGROUND OF THE INVENTION

1. Field of the Invention

The present invention relates to a memory interface apparatus responsive to received data for accessing a data memory and outputting the result of the access, and more particularly, to a memory interface apparatus responsive to reception of data to which number information is allocated in an input time series order for accessing a data memory by addressing using the number information and the like, and for processing and outputting the result of the access. It is noted that a data memory herein is a memory for storing data to be referred to or updated at the time of execution of processing in an information processor.

2. Description of the Background Art

Parallel processing is effective when high speed processing of a large amount of data, such as video signal processing, is desired. A so-called data driven type architecture has particularly attracted attention among parallel processing architectures.

In a data driven information processor, processing is performed according to a rule "when all the data needed for an operation are available and resources such as an operation unit required for the operation are assigned thereto, the operation is carried out".

In processing time series digital signals such as video signals, the same processing is often applied to each time series signal. Therefore, in a digital signal processing data driven information processor, a dynamic data driven method in which the same processing flow can be carried out with each time series data separated from each other.

FIG. 9 is a block diagram showing a conventional data driven information processor for digital image signal processing. FIGS. 10A and 10B are diagrams showing formats of data packets applied to a conventional example and an embodiment of the present invention.

FIG. 11 is a diagram showing a field configuration of a generation number in a data packet. FIG. 12 is a diagram showing an example of a logical arrangement of a data memory based on the field configuration of the generation number shown in FIG. 11.

The data packet shown in FIG. 10A includes an operation code C, a node number ND, a generation number GN corresponding to a time series order as described above, and data D. The node number ND is a number which is allocated to each node indicating each processing step (each operation code C) carried out in a data flow graph representing a data flow program. The data packet shown in FIG. 10B is the same as that shown in FIG. 10A except that the data packet of FIG. 10B includes first and second data D1 and D2 instead of data D in the data packet of FIG. 10A.

The data driven information processor of FIG. 9 includes a junction unit J for receiving and sequentially outputting a data packet; a waiting control unit FC for receiving a data packet, waiting data and producing paired data or a constant; a data memory MEM; an operation unit FP for performing operation processing and accessing memory MEM; a storage unit PS for pre-storing a data flow program of each type of processing such as video signal processing; and a branch unit B for receiving and outputting a data packet. These units are connected to each other through an internal pipeline shown by a thick solid line in the figure.

Referring to FIG. 11, generation number GN is data of a fixed length, and consists of an m-bit field address FD#, an n-bit line address LN# and a 1-bit pixel address PX#.

The content of generation number GN of FIG. 11 corresponds to the logical arrangement of data memory MEM shown in FIG. 12. Memory MEM serves as an image memory if the information processor performs video signal is processing and the logical arrangement thereof includes $2^m$ fields each specified by an m-bit field address FD#, each field includes $2^n$ lines in a vertical direction each corresponding to an n-bit line address LN#, and each line includes $2^1$ pixels each corresponding to a 1-bit pixel address PX#.

If processing according to a data flow program for image signal processing stored in storage unit PS in FIG. 9 is to be carried out, a data packet from the internal pipeline and a data packet of FIG. 10A externally applied to an information processor are first supplied to packet junction unit J, and sequentially output to waiting control unit FC. Waiting control unit FC receives a data packet, and waits for a data packet or fetches a pre-stored constant in order to produce paired data in view of a generation number GN of the received data packet, and thereafter, produces such a data packet as shown in FIG. 10B and outputs the data packet to operation unit FP.

An operation code C, a node number ND, a generation number GN and data D of input packet to unit FC are set in an operation code C, a node number ND, a generation number GN and first data D1 of the data packet of FIG. 10B produced in waiting control unit FC, respectively. If paired data is produced, data paired with data D is set in second data D2 of the data packet of FIG. 10B produced, and if a constant is fetched, the fetched constant is set therein.

Operation unit FP receives an applied data packet, and performs operation processing of first or second data D1 or D2 of the received data packet or accesses memory MEM according to the result of decoding an operation code C of the received data packet, and thereafter, outputs a data packet having a format of FIG. 10A to program storage unit PS. Normally, the result of operation processing or access to a memory is stored as data D in a data packet output from operation unit FP.

FIG. 13 is a block diagram illustrating access to a memory in a conventional operation unit FP, and FIG. 14 is a diagram illustrating an address modification step for access to a memory in FIG. 13.

In FIG. 13, a memory MEM is located in the center of the figure, for convenience. Blocks in FIG. 13 include an address modification unit amd, a memory access unit i/f, and a control unit Cn for controlling these units. In the case of performing access to a memory, a generation number GN in a received data packet is processed in address modification unit amd based on the step of FIG. 14, so that a logical address of two dimensions (line, pixel) by n planes (fields) indicated by the generation number GN is converted into a physical address of the memory MEM by address modification using an offset indicated by second data D2 of the received data packet.

In program storage unit PS, the subsequent operation code and a node number corresponding to that operation code are fetched from a pre-stored program based on a node number ND of a received data packet to be respectively set in the received data packet as an operation code C and a node number ND, and then, the received data packet is output. A data packet output from program storage unit PS is output externally or is output to the internal pipeline from branch unit B.

The above described data driven information processor has been to have an architecture suitable for digital image signal processing, since it can access two dimensions by n planes logically arranged at the time of performing access to a memory MEM, based on a generation number GN corresponding to time series data, that is, it can access, for each data packet, an address of a memory MEM corresponding to a scan position of an image signal.

In the arrangement of the above described operation unit FP, however, access to a memory MEM (see FIG. 13) and operation processing are carried out independently of each other in function, and therefore, filter operation, correlation operation and the like using the result of reference to a memory MEM, which are frequently used in image processing, must be performed in a plurality of nodes. Inclusion of a number of nodes in a data flow graph may cause an internal pipeline in an information processor to be crowded with data packets at the time of execution of processing according to the data flow program. In addition, overhead would be produced for waiting for data for operation processing of the resultant data of access to a data memory MEM. Consequently, improvement in throughput of processing has been difficult.

A technique has been proposed in U.S. application Ser. No. 08/215,564, now U.S. Pat. No. 5,502,834, in order to solve these problems. An operation unit FP is partially improved in this technique.

FIG. 15 is a block diagram illustrating access to a memory in an operation unit FP disclosed in U.S. application Ser. No. 08/215,564, now U.S. Pat No. 5,502,834. A memory MEM is located in the center of the figure, for convenience. Blocks in FIG. 15 are different from those in FIG. 13 in that blocks in FIG. 15 additionally include an arithmetic and logic unit alu for receiving and processing the result of access to a data memory MEM and include a control unit Cn1 instead of control unit Cn, in that an output of the arithmetic and logic unit alu is fed back to a path for access to a memory MEM, and in that each unit is controlled by control unit Cn1. With the structure of FIG. 15, simple access to a memory MEM, operation processing of resultant data of the access and data applied to operation unit FP, and update of the content of memory MEM using the result of the operation processing can be realized with a single received operation code C.

Use of an operation instruction which compounds access to memory MEM as described above allows operation using the result of access to a memory, which is frequently used in image processing, to be carried out with fewer nodes and without waiting for data in waiting control unit FC. Accordingly, reduction in the number of nodes causes reduction in the amount of data packets flowing in the information processor upon processing for each generation, and no waiting for data permits data packets of more generations to be supplied to the information processor, so that throughput of processing could be improved.

In the arrangement of FIG. 15, however, since a data packet which stores an intermediate result of correlation operation circulates through a pipeline or an intermediate result is temporarily stored in a data memory MEM, improvement in operation efficiency has not been easy. In addition, since processing is performed in a time direction in order to avoid waiting for data, it has been difficult to utilize parallelism in processing only by a function as shown in FIG. 15. It is noted that parallelism in processing herein means that processing includes a plurality of basic processings (access to a memory or operation) which can be carried out in parallel.

A further improved operation unit FP has been proposed to solve the above described problems.

FIG. 16 is a block diagram illustrating access to a memory in a proposed operation unit FP. A memory MEM is located in the center of the figure, for convenience.

FIGS. 17 and 18 are diagrams illustrating address modification steps for access to a memory in FIG. 16.

Blocks in FIG. 16 includes two memories MEMs, memory access units i/fs and address modification units amds corresponding to respective memories MEMs, a selector sl, an arithmetic and logic unit alu, and a control unit Cn2 for controlling each unit.

This arrangement enables not only two memories MEM to be accessed simultaneously (in parallel) in the case of FIG. 16, but also access to each memory MEM, operation using the result of the access, and update of the content of each memory MEM using the result of the operation to be carried out with a single operation code C. In addition, when memories MEMs are to be accessed, a single generation number GN corresponding to two dimensions (pixel, line) by n planes (fields) is converted-into two different physical addresses by address modification using different offsets indicated by second data D2 by means of the step shown in FIG. 17 or 18.

Use of an operation instruction which compounds parallel access to two memories MEMs as described above allows operation processing using the result of reference to a memory, which is frequently used in image processing, to be carried out with fewer nodes, so that data packets of more generations can be supplied to an information processor, resulting in improvement in throughput of processing.

It can be said that the apparatus of FIG. 16 has an architecture suitable for digital image signal processing since scanning of the content of a memory MEM corresponding to a scan position of an image signal and operation which compounds parallel access to two memories MEM can be carried out in an order of received data packets. However, parallel access to data memories MEMs is limited to at most two memories MEMs for a single operation code C, and therefore, parallelism in processing is not used sufficiently. Accordingly, since filter operation or correlation operation using at least three data must be processed serially using a plurality of instructions, it has been difficult to improve throughput of processing.

In addition, as shown in FIGS. 14, 17 and 18, a part (second data D2) of a field of a data packet is directly used as an offset of an address for access to a data memory MEM. Therefore, in particular when two different data memories MEMs are to be accessed in parallel, the range of an offset value must be reduced, or either a pixel offset or a line offset must be common to both data memories MEMs. With this restriction, even if two different data memories MEMs could be accessed in parallel, access to addresses, which have different pixels and different lines, of the memories MEMs to be accessed or access to a portion other than the region of the memories MEMs which can be subject to address modification using an offset must be processed serially with two instructions, so that parallelism in processing has not been used sufficiently.

SUMMARY OF THE INVENTION

It is an object of the present invention to provide a memory interface apparatus capable of carrying out operation processing which compounds access to a storage unit, utilizing parallelism in this processing sufficiently.

In order to attain this object, a memory interface apparatus in accordance with the present invention includes a processing unit and an access unit responsive to reception of a data packet having at least an operation code, data and an address for accessing a plurality of prescribed addresses of a storage unit. The access unit includes a storage address modification unit and a storage access unit, and the processing unit includes an operation unit.

The storage address modification unit includes a plurality of offset memories for pre-storing a plurality of offsets, and (i) according to an operation code of a received data packet, (i-1) reads an offset from each of the plurality of offset memories based on data of the received data packet, and thereafter, (i-1-1) modifies an address of the received data packet using the plurality of offsets which have been read, or (i-2) modifies an address of the received data packet using data of the received data packet, and (ii) outputs a plurality of prescribed addresses based on the result of the modification. The storage access unit accesses a plurality of prescribed addresses of the storage unit which are from the storage address modification unit, according to an operation code of the received data packet. The operation unit operates both the result of the access to a plurality of prescribed addresses by the storage access unit and data of the received data packet, according to an operation code of the received data packet.

According to the above described memory interface apparatus, since each offset of a plurality of prescribed addresses of the storage unit which are accessed by the storage access unit is pre-stored in an offset memory, the range of an offset value which can be set according to the content of an offset memory is increased.

Since both the result of access by the storage access unit to a plurality of prescribed addresses of the storage unit according to an operation code and data of a received data packet are operated according to an operation code, the access to a plurality of prescribed addresses of the storage unit and the above described operation processing subsequent to the access can be carried out with a single operation code.

The storage access unit of the above-described memory interface apparatus may be arranged to update the contents of a plurality of prescribed addresses of the storage unit which are output from the storage address modification unit, using the result of operation performed by the operation unit, if an operation code indicates update of the content of the storage unit. According to the memory interface apparatus arranged as such, access to a plurality of prescribed addresses of the storage unit, the subsequent operation processing using the result of these accesses, and update of the contents of a plurality of prescribed addresses of the storage unit using the result of this operation processing can be carried out with a single operation code.

The above described memory interface apparatus may be structured so that the storage unit includes a plurality of data memories, the storage address modification unit includes memory address modification units respectively corresponding to the plurality of data memories, and the storage access unit includes memory access units respectively corresponding to the plurality of data memories.

Each memory address modification unit has an offset table for pre-storing a plurality of offsets, and (i) according to an operation code of a received data packet, (i-1) reads an offset from the offset table based on data of the received data packet, and thereafter, (i-1-2) modifies an address of the received data packet using either data of the received data packet or an offset read from the offset table, and (ii) outputs an address to be modified as a prescribed address. According to a memory interface apparatus structured as such, parallel access to a plurality of data memories, and operation using the result of a plurality of accesses by this parallel access can be performed using a single operation code, and further, parallel access to a plurality of data memories, operation processing using the result of a plurality of accesses by this parallel access, and update of the contents of a plurality of data memories using the result of the operation processing can be carried out by a memory address modification unit and a memory access unit provided corresponding to each data memory, using a single operation code.

The above described memory interface apparatus may be structured so that the storage address modification unit includes an address sequential modification unit, the storage access unit includes a sequential access unit, and the operation unit includes an accumulation operation unit.

The address sequential modification unit has a plurality of offset tables for pre-storing a plurality of offsets, and (i) according to an operation code of a received data packet, (i-1) sequentially reads an offset from each of the plurality of offset tables based on data of the received data packet, and thereafter, (i-2) sequentially modifies an address of the received data packet using either an offset which has been read or data of the received data packet every time an offset is sequentially read, and (ii) outputs an address sequentially modified as a prescribed address. The sequential access unit sequentially accesses a prescribed address of the storage unit which is sequentially output from the address sequential modification unit, according to an operation code of the received data packet. The accumulation operation unit sequentially receives the result of access by the sequential access unit, and performs sequential operation according to an operation code of the received data packet using data of the received data packet or the result of access which is sequentially received, while accumulating of each operation result. With such an arrangement, sequential access to a plurality of prescribed addresses of the storage unit and accumulation operation processing using the result of each access can be carried out with a single operation code. In addition, sequential access to a plurality of prescribed addresses of the storage unit, accumulation operation processing using the result of the access, and update of the contents of the plurality of prescribed addresses of the storage unit using the result of the accumulation operation processing can be performed with a single operation code.

The above described storage unit may be structured to store image data, and operation by the above described operation unit may be used for filter operation or correlation operation of image data. With such a structure, operation processing, which compound access to the storage unit, in filter operation or correlation operation of image can be carried out utilizing parallelism in this operation processing sufficiently.

The above described memory interface apparatus may be provided in a data driven processor. In this case, both access to a plurality of prescribed addresses of the storage unit and operation processing using the result of the access can be performed with a single operation code, and further, access to a plurality of prescribed addresses of the storage unit, operation processing using the result of the access, and update of the contents of the plurality of prescribed addresses of the storage unit using the result of the operation processing can be carried out with a single operation code, so that reduction in both processing time and the amount of data packet flow per unit processing in a data driven processor is achieved, resulting in improvement in throughput in the processor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A to 5E are diagrams showing comparison of total sum processing of image data shown in FIGS. 4A and 4B between a conventional example and an embodiment of the present invention.

FIGS. 6A to 6D are diagrams illustrating an example of access to a memory using an offset in accordance with an embodiment of the present invention.

DESCRIPTION OF THE PREFERRED EMBODIMENTS

Embodiments of the present invention will now be described in detail in conjunction with the accompanying drawings.

Figure 1:
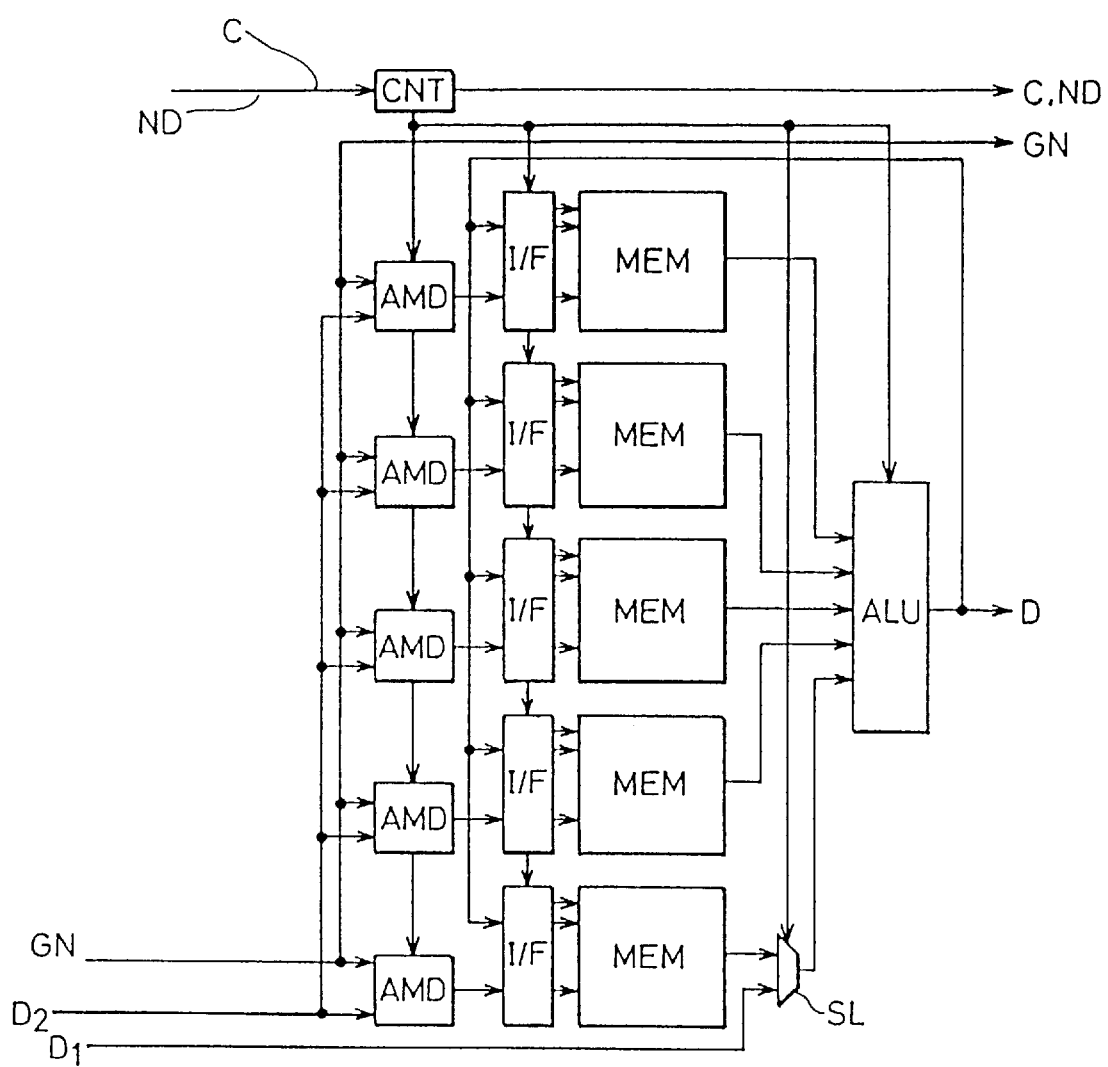
FIG. 1 is a block diagram showing a memory interface apparatus in accordance with an embodiment of the present invention.

FIG. 1 is a block diagram showing a memory interface apparatus in accordance with an embodiment of the present invention. Although data memories MEMs which are image memories are shown in the center of FIG. 1, for convenience, this interface apparatus indicates a portion that may or may not include these memories MEMs.

Figure 9:
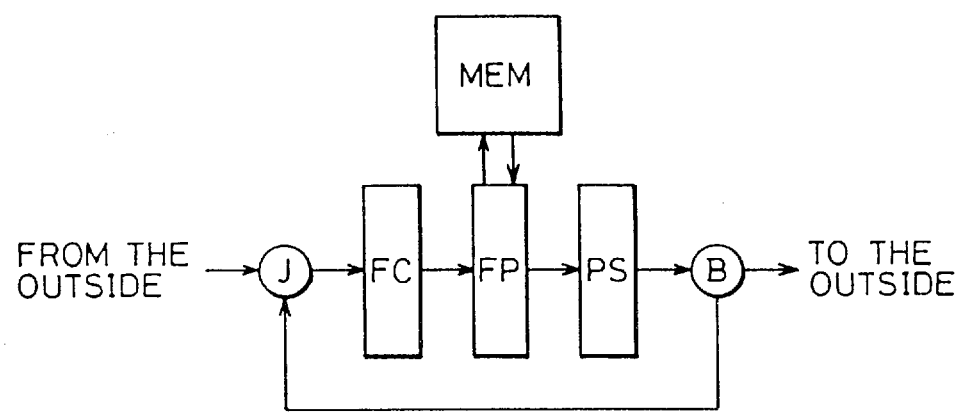
FIG. 9 is a block diagram showing a conventional data driven information processor for digital image signal processing.
Figure 10A:
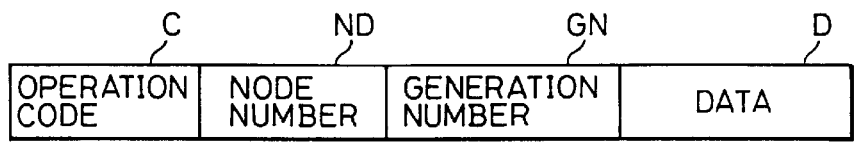
FIGS. 10A and 10B are diagrams showing formats of a data packet applied to a conventional example and an embodiment of the present invention.
Figure 10B:
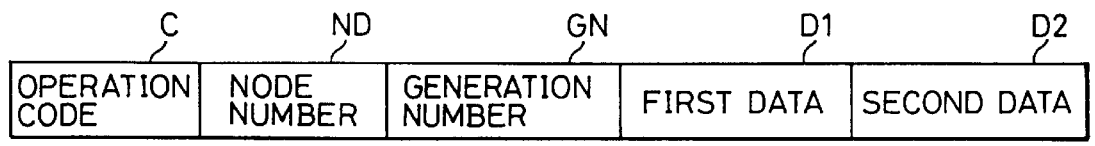

The memory interface apparatus of FIG. 1 is equivalent to an apparatus for realizing processing function including parallel access to five memories MEMs by an operation unit FP when a data driven information processor for video signal processing shown in FIG. 9 includes five data memories MEMs. Since processing function of FIG. 9 is otherwise similar to that of a conventional example, description thereof will not be repeated.

The apparatus of FIG. 1 includes an address modification units AMDs and memory access units I/Fs respectively corresponding to five data memories MEMs. The apparatus further includes an arithmetic and logic unit ALU having a plurality of input ports, a selector SL, and a control unit CNT for controlling each unit.

Selector SL selects the result of access to a corresponding data memory MEM or first data D1 of a received data packet according to a control signal of control unit CNT, and applies the selected data to one of the input ports of arithmetic and logic unit ALU. When data of a received data packet and the content of a memory MEM are to be operated, first data D1 of a received data packet is selected by selector SL to be applied to one of the input ports of arithmetic and logic unit ALU.

Control unit CNT controls, in response to an operation code C of a received data packet, each address modification unit AMD to look up an offset table OFT, which will be described later, based on second data D2 of a received data packet to output a resultant value of the table look-up as an offset Of or to output second data D2 as an offset Of. Control unit CNT controls memory access unit I/F to refer to or update a corresponding data memory MEM, in response to an operation code C of a received data packet. Control unit CNT controls, in response to an operation code C, selector SL to apply, to one of the input ports of arithmetic and logic unit ALU, either the result of access (reference) to a data memory MEM corresponding to the input port or received first data D1. Control unit CNT controls, in response to a received operation code C, arithmetic and logic unit ALU to perform a desired operation.

Figure 2:
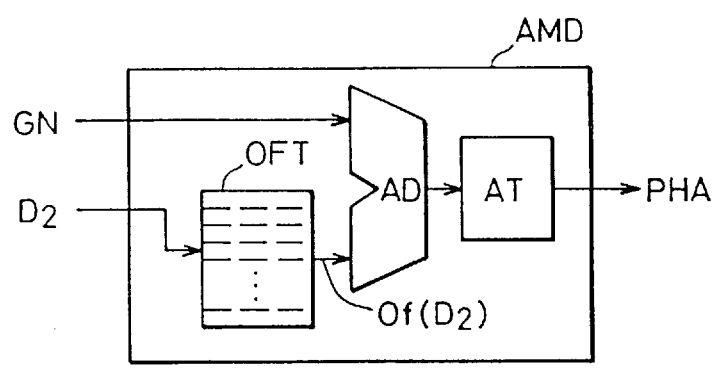
FIG. 2 is a block diagram showing an address modification unit AMD of FIG. 1.

FIG. 2 is a block diagram showing each address modification unit AMD of FIG. 1, and address modification units AMDs of FIG. 1 have the same arrangement. Address modification unit AMD receives and processes a generation number GN and second data D2 of a received data packet, and outputs a physical address PHA of a corresponding memory MEM to a corresponding memory access unit I/F. Therefor, address modification unit AMD includes an offset table OFT, an adder AD, and an address translator (converter) AT. Offset table OFT pre-stores a plurality of offsets Ofs of address, and is accessed using second data D2 as an index. Adder AD adds each of a field address FD#, a pixel address PX# and a line address LN# of a generation number GN to either second data D2 or a corresponding offset Of read from the table OFT. Address translator AT translates (converts) a resultant value of addition in adder AD into a physical address PHA and outputs the physical address PHA.

Figure 3:
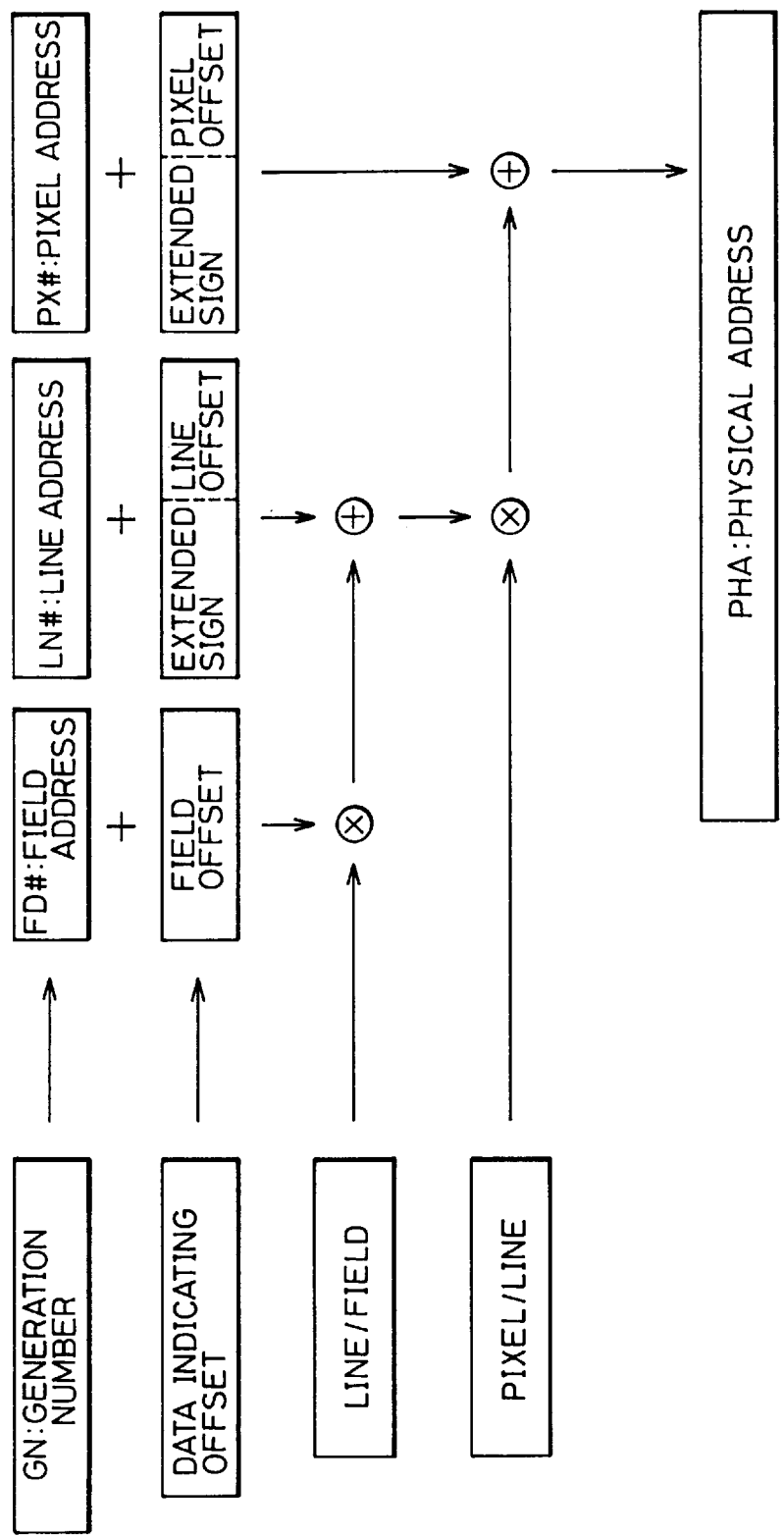
FIG. 3 is a diagram illustrating an address modification step in each address modification unit AMD of FIG. 1.

FIG. 3 is a diagram illustrating an address modification step in each address modification unit AMD of FIG. 1. When a memory is accessed, a generation number GN and second data D2 of a data packet are applied in parallel to each address modification unit AMD. In each address modification unit AMD, a single generation number GN corresponding to two dimensions (line, pixel) by n planes (fields) is subject to address modification using offsets which are different from each other for each address modification unit AMD to be converted into five different physical addresses PHAs, as shown in the step of FIG. 3. Each physical address PHA is applied to each corresponding memory access unit I/F, and each memory access unit I/F addresses and accesses a corresponding data memory MEM based on an applied physical address PHA.

Figure 11:
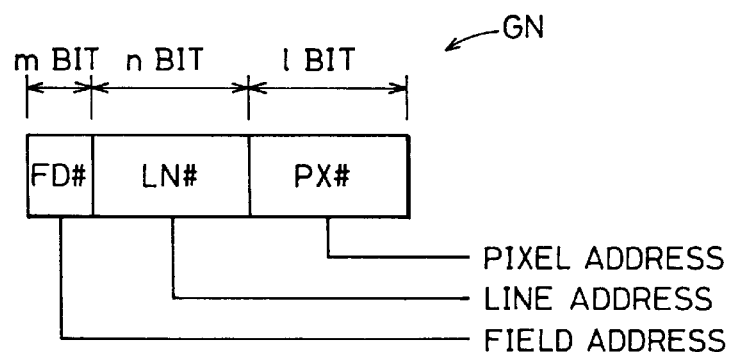
FIG. 11 is a diagram showing a field configuration of a generation number of a data packet.
Figure 12:
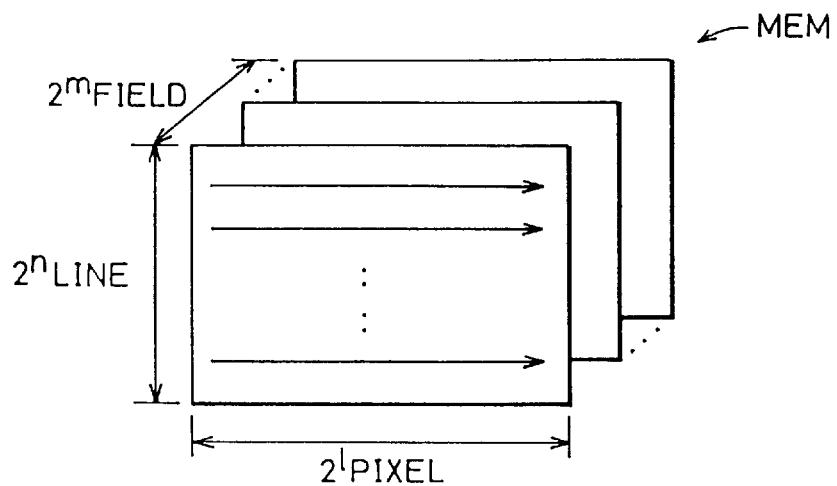
FIG. 12 is a diagram showing an example of a logical arrangement of a data memory based on the field configuration of a generation number shown in FIG. 11.
Figure 13:
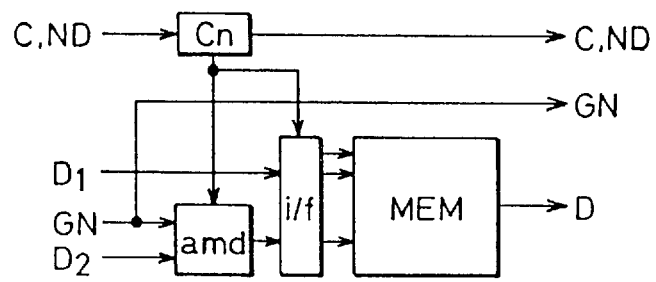
FIG. 13 is a block diagram illustrating access to a memory by a conventional operation unit FP.
Figure 14:
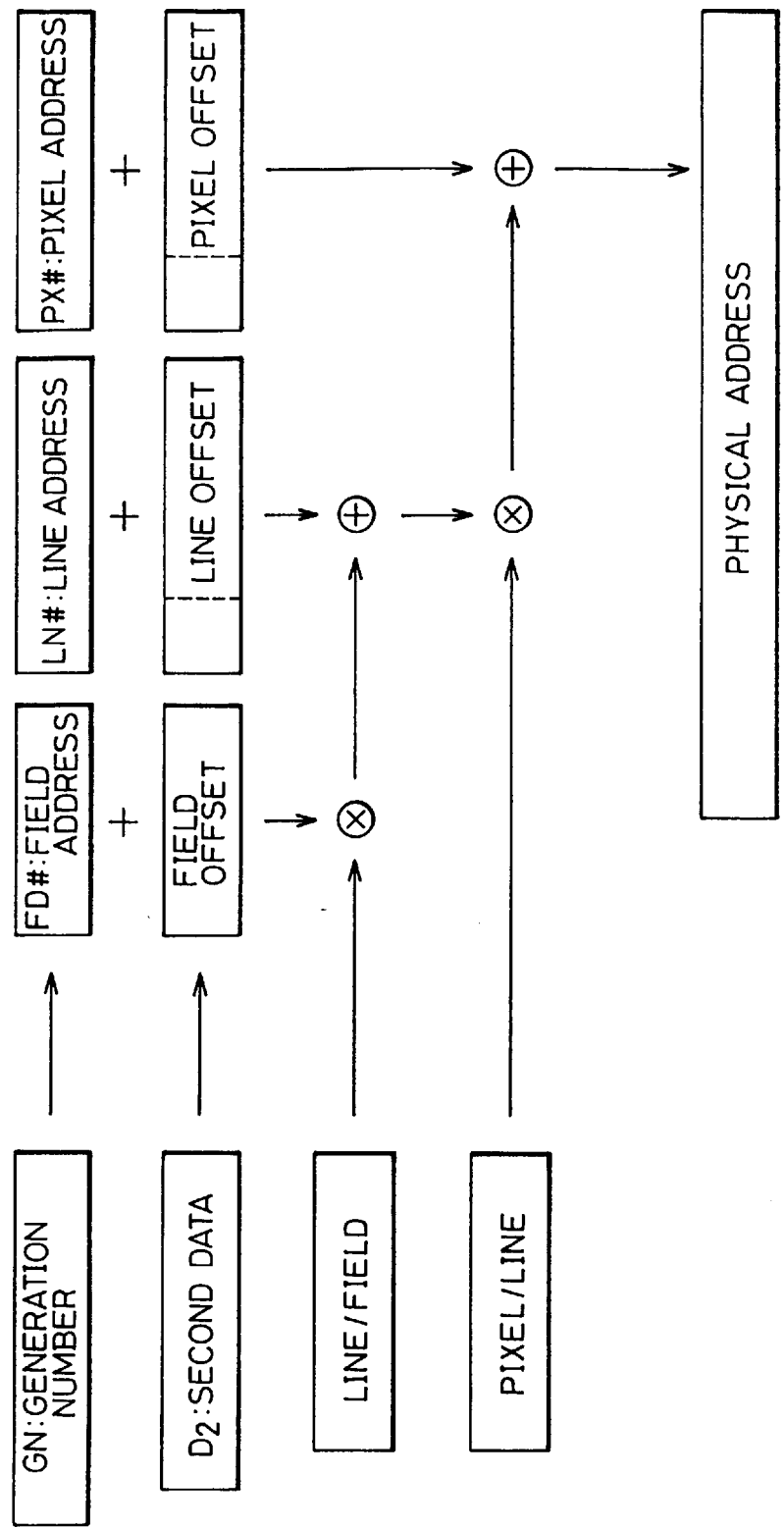
FIG. 14 is a diagram illustrating an address modification step for access to a memory in FIG. 13.
Figure 15:
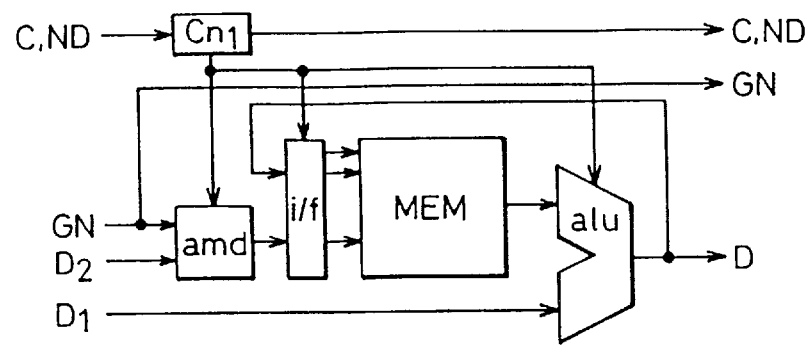
FIG. 15 is a block diagram illustrating access to a memory by an operation unit FP disclosed in U.S. application Ser. No. 08/215,564, now U.S. Pat. No. 5,502,834.

An address modification step in address modification unit AMD will now be described with reference to FIG. 3. First, a generation number GN is divided into three fields to which a field address FD#, a line address LN# and a pixel address PX# as shown in FIG. 11 are respectively allocated, and data indicating an offset, that is, data D2 or an offset Of read from an offset table OFT is divided into three fields to which a field offset, a line offset and a pixel offset are respectively allocated. At this time, a line offset and a pixel offset are sign-extended so as to match bit widths of a line address and a pixel address, respectively. Then, each address of three fields is subject to address modification by means of add processing with clipping (processing in which each address is modified to a minimum value or a maximum value if underflow or overflow is produced) using a corresponding offset, and thereafter, a physical address PHA is calculated from an address obtained by the address modification using an offset, the number of lines per field and the number of pixels per line.

If access by a memory access unit I/F according to an operation code C is reference to a data memory MEM, memory access unit I/F reads data from a corresponding memory MEM by addressing based on an applied physical address PHA, and applies the data to arithmetic and logic unit ALU. In addition, if access by a memory access unit I/F according to an operation code C is an update of the content of a data memory MEM, memory access unit I/F receives data D output from arithmetic and logic unit ALU, and writes the data D to a memory MEM by addressing based on an applied physical address PHA.

Arithmetic and logic unit ALU receives first data D1 applied from selector SL or resultant data of access to each data memory MEM, operates the received data based on a control signal according to a received operation code C which is applied from control unit CNT, and outputs resultant data D of the operation to both the outside of the memory interface apparatus and each memory access unit I/F.

With such a structure as described above, not only can five data memories MEMs be accessed in parallel, but also the result of each access can be simultaneously operated using a received single operation code C.

Figure 4A:
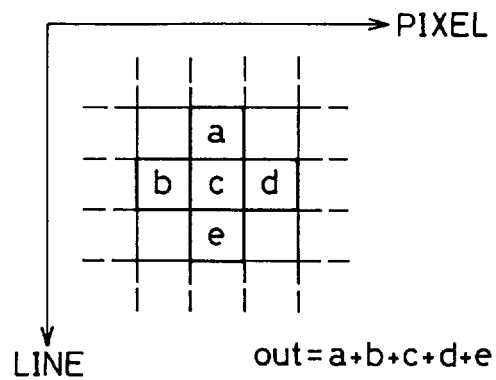
FIGS. 4A and 4B are diagrams illustrating the concept of total sum processing of image data.
Figure 4B:
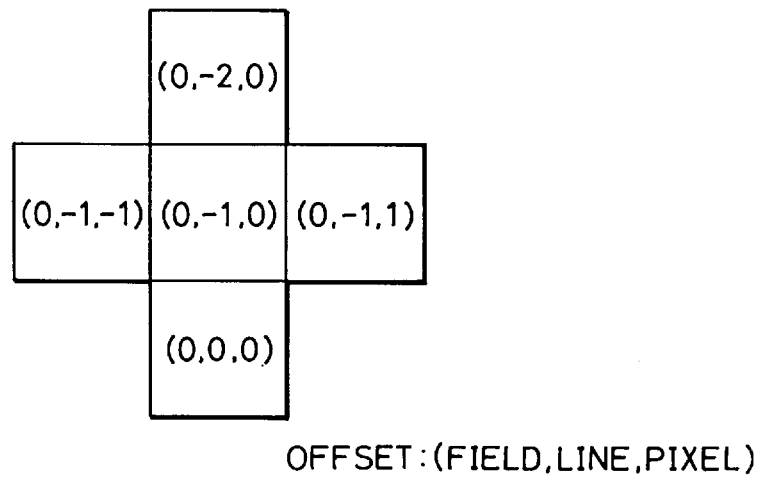

FIGS. 4A and 4B are diagrams showing the concept of total sum processing of image data. FIG. 4A shows the concept of total sum operation processing in which the sum of a value of one picture element and values of four picture elements in the periphery thereof in image data is obtained. Since image data is supplied to an apparatus in such an order as a picture element a, . . . , a picture element b, a picture element c, a picture element d, . . . , a picture element e according to a scanning direction of a video signal, all the data centering on a picture element c required for the total sum operation are available at the time when a value of a picture element e is supplied. FIG. 4B shows correlation positions of picture elements a–e with respect to the picture element e, and each of these correlation positions is an offset Of for access to a memory at the time of performing the total sum operation processing.

FIGS. 5A to 5E are diagrams showing comparison of total sum operation processing of image data shown in FIGS. 4A and 4B between a conventional example and an embodiment of the present invention. FIG. 5A shows a data flow graph in a conventional data driven information processor using nodes 1 to 5, and FIG. 5B shows processing in each node of FIG. 5A. In FIG. 5B, $In_1$ and $In_2$ respectively indicate first and second data $D_1$ and $D_2$ of a received data packet, Out indicates output data, and M (f, l, p) indicates reference (when M (f, l, p) is located on the right side of a substitution expression) to or update (when M (f, l, p) is located on the left side of a substitution expression) of a physical address corresponding to the result obtained by adding a field offset f, a line offset l and a pixel offset p to an address of a picture element represented by a current generation number GN.

Figure 16:
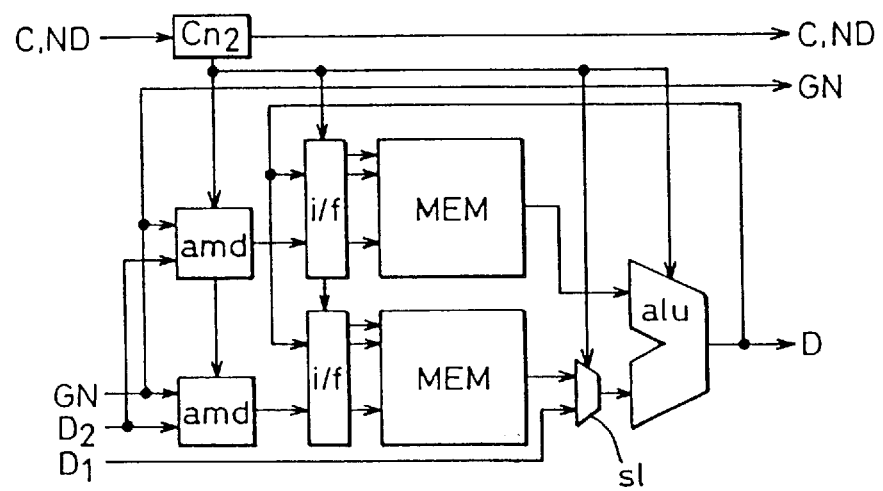
FIG. 16 is a block diagram illustrating access to a memory in a proposed operation unit FP.
Figure 17:
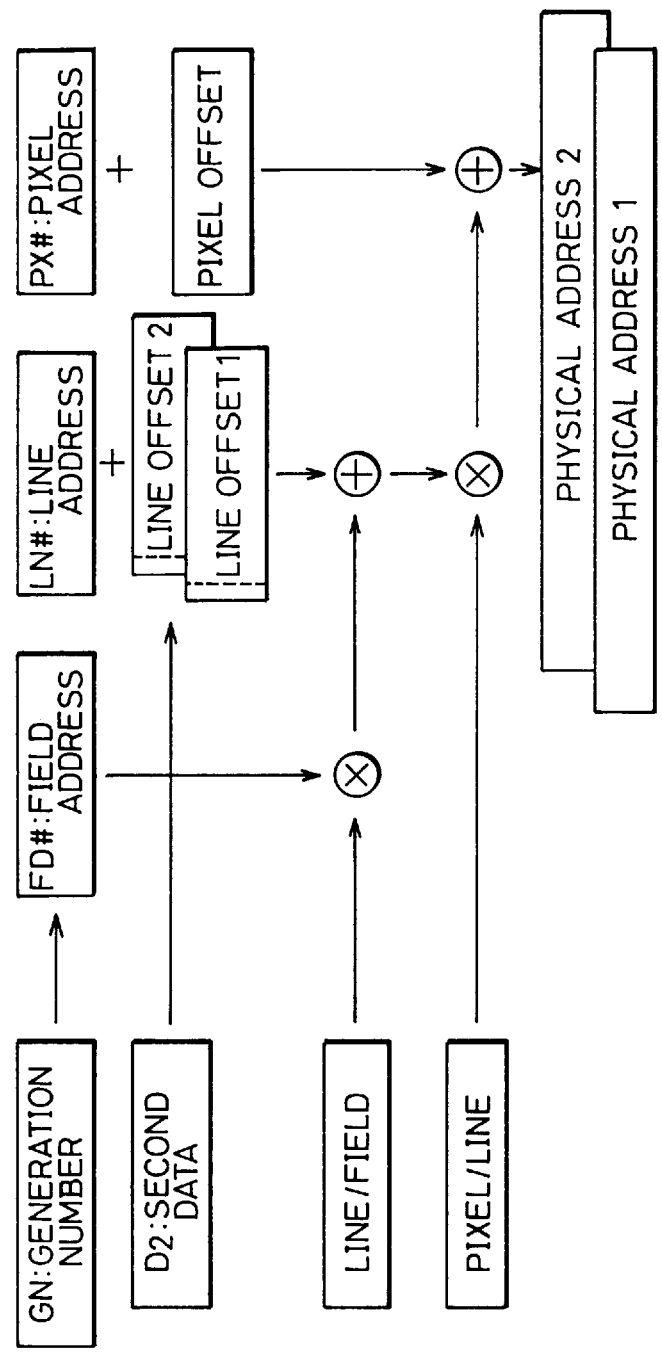
FIG. 17 is a diagram illustrating an address modification step for access to a memory in FIG. 16.
Figure 18:
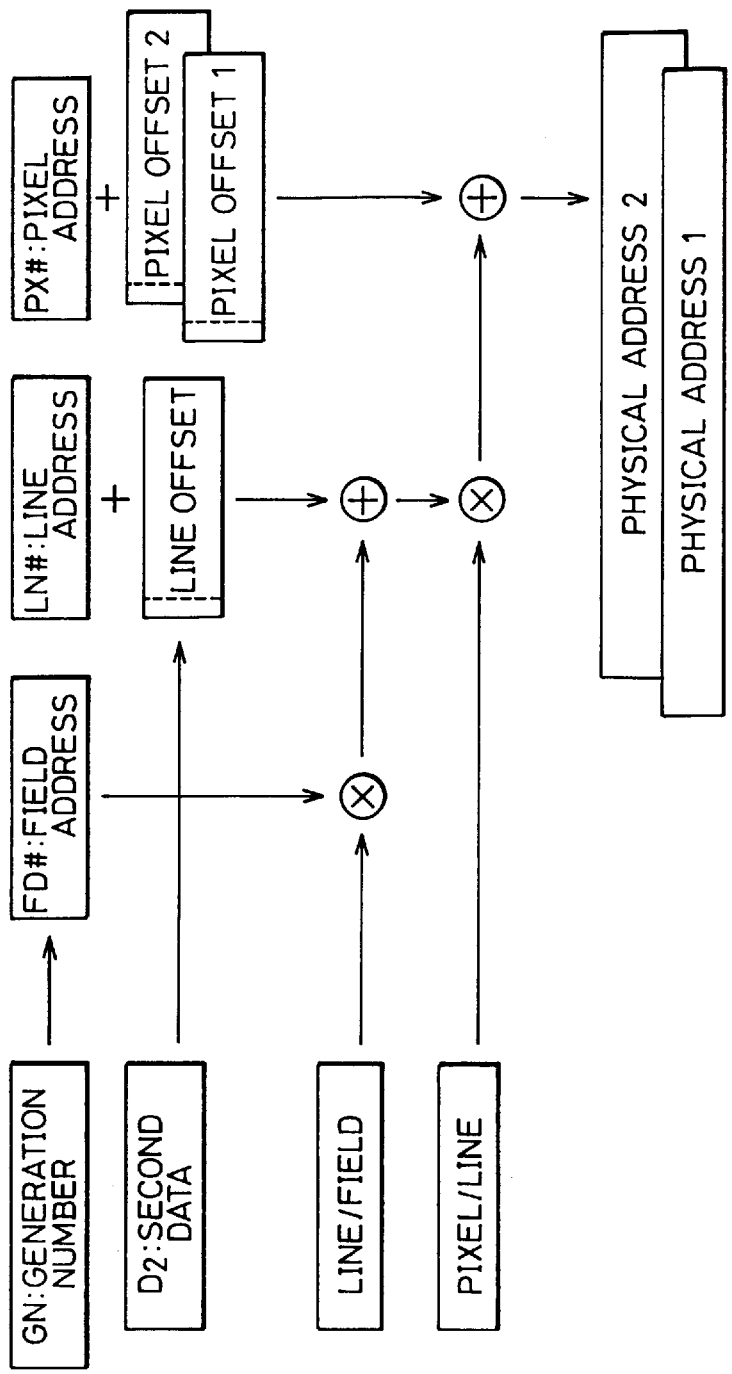
FIG. 18 is a diagram illustrating an address modification step for access to a memory in FIG. 16.

The same data is written simultaneously to two memories MEMs and the number of memories MEMs which can be accessed simultaneously (in parallel) is limited to two as shown in FIG. 16, so that five nodes are required for conventional total sum processing as shown in FIG. 5A.

FIG. 5C shows a data flow graph in a data driven information processor having five data memories MEMs in accordance with an embodiment of the present invention. FIG. 5D shows processing in each node of FIG. 5C in a manner similar to that described above. When a data memory MEM of the present embodiment is updated, the same data is simultaneously written to five memories MEMs as shown in FIG. 1. FIG. 5E shows the content of an offset table OFT in each of address modification units AMDs (in the figure, $AMD_1$–$AMD_5$) in correspondence to each address. In this example, an address tbl_addr of an offset table OFT in each address modification unit AMD is designated in a node 2 of FIG. 5C. Since a plurality of offsets Ofs corresponding to processing have been written in advance, in correspondence to an address, to an offset table OFT in address modification unit AMD, a corresponding offset Of is read by this addressing. In accordance with the present embodiment, the total sum processing can be realized in only two nodes as shown in FIG. 5C.

FIGS. 6A to 6D are diagrams illustrating an example of access to a memory by means of an offset in accordance with an embodiment of the present invention. In FIGS. 6A to 6C, respective access positions of five data memories MEMs are shown by 1 to 5. In FIG. 6D, offsets Ofs of five memories MEMs are respectively shown by AMD (1) to AMD (5) for each case of FIGS. 6A to 6C.

Although simple address modification of the periphery of one picture element by means of offsets Ofs is shown in the above described embodiment, an offset Of is based on the result of reference to a table OFT in the present embodiment, and therefore, various offsets can be designated according to the content of setting of a table OFT as shown in FIGS. 6A to 6D. More specifically, a conventional example uses data in a field of a received data packet, so that the range of a region of each data memory MEM, which can be subject to address modification using an offset, has been limited, while the present embodiment uses the content of setting of a table OFT, so that the range of a region of each data memory MEM, which can be subject to address modification using an offset, will not be limited.

In addition, the present embodiment includes five data memories MEMs; address modification units AMDs for producing an address for access and memory access units I/Fs for accessing a memory MEM based on the produced address, which are provided respectively corresponding to these memories MEMs; and an arithmetic and logic unit ALU for performing operation based on a plurality of results of access obtained by parallel access to these five memories MEMs.

In accordance with the above described arrangement of an apparatus with limitation on the range of a region of a data memory MEM, which can be subject to address modification by means of an offset, being eliminated, parallel access to a plurality of data existing in the vicinity of an address of a data memory MEM, which corresponds to a generation number GN of a received data packet, operation based on resultant data of each access, and update of each data memory MEM using the result of this operation can be carried out with a received single operation code C, achieving high speed processing. In addition, parallelism in processing can be utilized sufficiently, so that processing time and the amount of data packet flow in a data driven information processor per unit processing can be reduced.

Although the present embodiment is provided with five memories MEMs, it is desirable to determine the number of memories MEMs to be provided in view of parallelism in processing.

Figure 7:
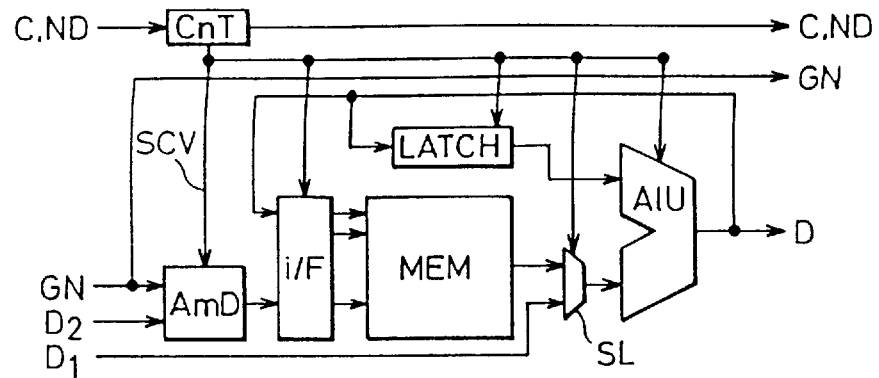
FIG. 7 is a block diagram showing a memory interface apparatus in accordance with another embodiment of the present invention.

FIG. 7 is a block diagram showing a memory interface apparatus in accordance with another embodiment of the present invention. Although a data memory MEM is shown in the center of FIG. 7, for convenience, this interface apparatus indicates a portion other than the memory MEM. The memory interface apparatus of FIG. 7 is equivalent to an apparatus for realizing processing function to serially access a data memory MEM of an operation unit FP of the data driven information processor of FIG. 9 up to five times successively. In this case, since other processing functions of the information processor of FIG. 9 are similar to those of the conventional example, description thereof will not be repeated.

The memory interface apparatus of FIG. 7 includes an address modification unit AmD, a memory access unit i/F, a latch unit LATCH, a selector sL, an arithmetic and logic unit AlU, and a control unit CnT for controlling each unit.

Selector sL selects either the result of access to a data memory MEM or first data D1 of a received data packet according to a control signal from control unit CnT, and applies the selected data to one input of arithmetic and logic unit AlU. At the time of this selection, if data of a received data packet and the result (intermediate result latched by latch unit LATCH) of access to a memory MEM are to be operated, first data D1 is selected as one input of arithmetic and logic unit AlU.

Control unit CnT controls, in response to a received operation code C, address modification unit AmD to look up offset tables OfT1–OfT5, which will be described later, according to received second data D2 whether to use the result of the look-up as an offset Of or to use received second data D2 as an offset Of. If offset tables OfT1–OfT5 are to be look up, control unit CnT controls, by a state count value SCV which will be described later, address modification unit AmD to look up which offset table.

Control unit CnT controls, in response to an operation code C, memory access unit i/F whether to refer to or update the content of a data memory MEM. Control unit CnT controls, in response to a received operation code C, latch unit LATCH whether or not to receive data D output from arithmetic and logic unit AlU to latch the received data. Control unit CnT controls, in response to a received operation code C, whether to select the result of access to a data memory MEM and apply it to one input of arithmetic and logic unit AlU, or to select received first data D1 and apply the data D1 thereto. Control unit CnT controls, in response to a received operation code C, arithmetic and logic unit AlU to perform the operation.

If at least two addresses of a data memory MEM are serially (sequentially) accessed based on a received operation code C and operation using the result of access is performed, latch unit LATCH operates so as to hold an intermediate result (D) of operation performed by arithmetic and logic unit AlU. Accordingly, arithmetic and logic unit AlU performs operation, accumulating the intermediate result held by latch unit LATCH.

Just as the above described memory access unit I/F, memory access unit i/F reads data from a memory MEM based on an address applied from address modification unit AmD in the case of reference to a memory MEM, while it receives data D output from arithmetic and logic unit AlU and writes the received data D to a memory MEM based on an address applied from address modification unit AmD in the case of update of data in a memory MEM.

Figure 8:
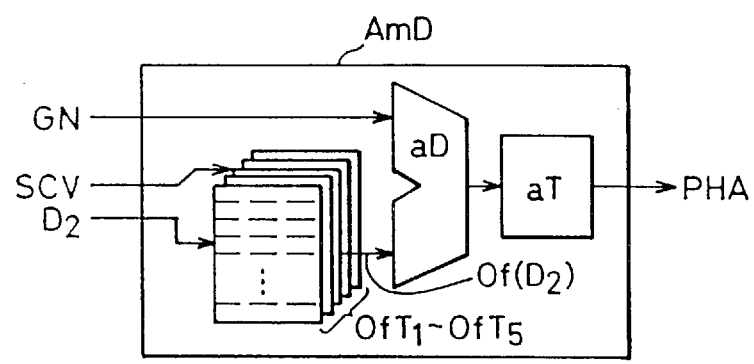
FIG. 8 is a block diagram showing an address modification unit AmD of FIG. 7.

FIG. 8 is a block diagram showing address modification unit AmD of FIG. 7. Address modification unit AmD receives a generation number GN, a state count value SCV and second data D2 of a received data packet, processes them, and sequentially outputs a physical address PHA for a memory MEM to memory access unit i/F. Therefor, address modification unit AmD includes five offset tables OfT1–OfT5, an adder aD and an address translator (converter) aT.

Each of offset tables OfT1–OfT5 pre-stores a plurality of different offsets, and is accessed sequentially in a time-sharing manner based on an index consisting of received second data D2 and state count value SCV which will be described later. Thus, an offset Of is sequentially read from each offset table to be applied to adder aD. Upon each reception of a sequentially applied offset Of, adder aD adds either data D2 or an offset Of to a generation number GN, and applies the result of addition to address translator aT. Address translator aT translates (converts) sequentially applied result of addition into a physical address PHA for a data memory MEM and outputs the physical address. Accordingly, five physical addresses PHAs are sequentially applied from address modification unit AmD to access unit i/F.

When a memory is to be accessed in the memory interface apparatus of FIG. 7, a single generation number GN corresponding to two dimensions (line, pixel) by n planes (fields) is serially converted into five physical addresses PHAs by time-sharing control by control unit CnT of address modification unit AmD by an approach similar to the step of FIG. 3 described above. Thus, not only five addresses of a data memory MEM can be successively and sequentially accessed but also operation using the results of these accesses can be performed with a single operation code C.

If the above described processing is considered from a viewpoint of software, the embodiment of FIG. 7 is similar to that of FIG. 1, and therefore, the same data flow graph (see FIG. 5C) as that of FIG. 1 can be carried out using the apparatus of FIG. 7. Accordingly, an example of processing shown in FIG. 4 for the embodiment of FIG. 1 can be directly applied to the embodiment of FIG. 7 except for setting of data of an offset table in an address modification unit.

If data of each of offset tables OfT1–OfT5 in address modification unit AmD of FIG. 8 is set such that an offset table OFT in each address modification unit AMD of FIG. 1 is sequentially selected by a state count value SCV in a time-sharing manner, access to a data memory MEM equivalent to access of FIG. 1 can be achieved by the apparatus of FIG. 7. More specifically, as to the case of FIGS. 6A to 6D, for example, offsets AMD (1)–AMD (5) of an offset table OFT in each address modification unit AMD may be respectively stored in offset tables OfT1–OfT5 such that these offsets AMD (1)–AMD (5) can be accessed respectively based on indexes using different state count values SCVs.

In the apparatus of FIG. 7, a function equivalent to that of the apparatus of FIG. 1 as described above can be realized with a structure including a single data memory MEM, an address modification unit AmD, a memory access unit i/F and a latch unit LATCH, that is, a structure in which an increase in the amount of hardware is suppressed. In addition, as to an offset for addressing a data memory MEM, the range of a region of a data memory MEM, which can be subject to address modification, would be significantly increased by setting of an offset table in the case of the memory interface apparatus of FIG. 7 as well.

Although five offset tables are provided in the present embodiment, it is desirable to determine the number of tables to be provided in view of parallelism in processing to be executed.

In the memory interface apparatus of FIG. 1, a plurality of data existing in the vicinity of an address corresponding to a received generation number GN are read in parallel (simultaneously), and operation can be carried out using the plurality of data which have been read, according to a received single operation code C, so that parallelism in processing can be utilized sufficiently as described in FIG. 5.

Furthermore, in the memory interface apparatus of FIG. 7, a plurality of data existing in the vicinity of an address corresponding to a received generation number GN are read from a memory MEM, and operation can be carried out using the plurality of data which have been read, according to a received single operation code C, so that processing for the received operation code C is completed in the memory interface apparatus, that is, in operation unit FP.

Thus, the amount of data packet flow per unit processing in an information processor can be reduced in a data driven information processor provided with either memory interface apparatuses of FIG. 1 or FIG. 7, so that correlation operation or filter operation with high throughput can be carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory interface apparatus, comprising:
    an access unit responsive to reception of a data packet including at least one operation code, an address and data for accessing a plurality of prescribed addresses of a storage unit; and
    a processing unit, wherein
        said access unit includes
            storage unit address modifying means having a plurality of offset memories for pre-storing a plurality of offsets, and according to one of said at least one operation code in said received data packet, reading said offset from each of said plurality of offset memories based on said data of said received data packet and modifying said address of said received data packet using said plurality of offsets which have been read or modifying said address of said received data packet using said data of said received data packet, and outputting said plurality of prescribed addresses based on a result of said modification, and
            storage unit accessing means for accessing, according to said one operation code of said received data packet, said plurality of prescribed addresses of said storage unit output from said storage unit address modifying means, and
        said processing unit includes operation means for performing, according to said one operation code of said received data packet, operation of a result of access to said plurality of prescribed addresses by said storage unit accessing means and said data of said received data packet.

2. The memory interface apparatus according to claim 1, wherein
    said storage unit accessing means updates, using a result of said operation by said operation means, a content of said plurality of prescribed addresses of said storage unit output from said storage unit address modifying means, when said operation code of said received data packet indicates update of a content of said storage unit.

3. The memory interface apparatus according to claim 2, wherein
    when said storage unit includes a plurality of data memories which are accessed in parallel respectively based on said plurality of prescribed addresses,
    said storage unit address modifying means includes memory address modifying means respectively corresponding to said plurality of data memories, and
    said storage unit accessing means includes memory accessing means respectively corresponding to said plurality of data memories,
    each of said memory address modifying means includes offset table for pre-storing a plurality of said offsets, and according to said operation code of said received data packet, reads said offsets from said offset table based on said data of said received data packet, modifies said address of said received data packet using either said data of said received data packet or said offset read from said offset table, and outputs said modified address as said prescribed address, and
    each of said memory accessing means accesses, according to said operation code of said received data packet, said prescribed address of corresponding one of said data memories output from corresponding one of said memory address modifying means.

4. The memory interface apparatus according to claim 3, wherein
    each of said memory address modifying means includes
        adding means for adding, according to said operation code of said received data packet, either said data of said received data packet or said offset read from said offset table and said address of said received data packet, and
        translating means for translating a result of said addition into said prescribed address.

5. The memory interface apparatus according to claim 2, wherein
    said storage unit address modifying means includes
        address sequential modification means having a plurality of offset tables for pre-storing a plurality of said offsets, and according to said operation code of said received data packet, sequentially reading said offset from each of said plurality of offset tables based on said data of said received data packet, sequentially modifying said address of said received data packet using either said offset which has been read or said data of said received data packet every time said offset is sequentially read, and sequentially outputting said sequentially modified address as said prescribed address, said storage unit accessing means includes
sequential access for sequentially accessing, according to said operation code of said received data packet, said prescribed address sequentially output from said address sequential modification means, and said operation means includes
accumulation operation means for sequentially receiving a result of said access by said sequential access means, and performing, according to said operation code of said received data packet, sequential operation of data of said received data packet or a sequentially received result of said access with each operation result accumulated.

6. The memory interface apparatus according to claim 5, wherein said address sequential modification means includes
adding means for adding, according to said operation code of said received data packet, said offset which has been read or said data of said received data packet to said address of said received data packet to sequentially output a result of addition every time said offset is sequentially read from said plurality of offset tables, and translating means for translating said result of addition sequentially output from said adding means into said prescribed address.

7. The memory interface apparatus according to claim 5, wherein said storage unit address modifying means further includes control means for controlling, for sequential read of said offset, each of said plurality of offset tables to be accessed based on said data of said received data packet in a time-sharing manner.

8. The memory interface apparatus according to claim 1, wherein when said storage unit includes a plurality of data memories which are accessed in parallel respectively based on said plurality of prescribed addresses, said storage unit address modifying means includes memory address modifying means respectively corresponding to said plurality of data memories, and said storage unit accessing means includes memory accessing means respectively corresponding to said plurality of data memories, each of said memory address modifying means includes an offset table for pre-storing a plurality of said offsets, and according to said operation code of said received data packet, reads said offsets from said offset table based on said data of said received data packet, modifies said address of said received data packet using either said data of said received data packet or said offset read from said offset table, and outputs said modified address as said prescribed address, and each of said memory accessing means accesses, according to said operation code of said received data packet, said prescribed address of corresponding one of said data memories output from corresponding one of said memory address modifying means.

9. The memory interface apparatus according to claim 8, wherein each of said memory address modifying means includes
adding means for adding, according to said operation code of said received data packet, either said data of said received data packet or said offset read from said offset table and said address of said received data packet, and translating means for translating a result of said addition into said prescribed address.

10. The memory interface apparatus according to claim 1, wherein said storage unit address modifying means includes
address sequential modification means having a plurality of offset tables for pre-storing a plurality of said offsets, and according to said operation code of said received data packet, sequentially reading said offset from each of said plurality of offset tables based on said data of said received data packet, sequentially modifying said address of said received data packet using either said offset which has been read or said data of said received data packet every time said offset is sequentially read, and sequentially outputting said sequentially modified address as said prescribed address, said storage unit accessing means includes
sequential access for sequentially accessing, according to said operation code of said received data packet, said prescribed address sequentially output from said address sequential modification means, and said operation means includes
accumulation operation means for sequentially receiving a result of said access by said sequential access means, and performing, according to said operation code of said received data packet, sequential operation of data of said received data packet or a sequentially received result of said access with each operation result accumulated.

11. The memory interface apparatus according to claim 10, wherein said address sequential modification means includes
adding means for adding, according to said operation code of said received data packet, said offset which has been read or said data of said received data packet to said address of said received data packet to sequentially output a result of addition every time said offset is sequentially read from said plurality of offset tables, and translating means for translating said result of addition sequentially output from said adding means into said prescribed address.

12. The memory interface apparatus according to claim 10, wherein said storage unit address modifying means further includes control means for controlling, for sequential read of said offset, each of said plurality of offset tables to be accessed based on said data of said received data packet in a time-sharing manner.

13. The memory interface apparatus according to claim 1, wherein said data of said data packet includes modification data used for said modification by said storage unit address modifying means, and operation data used for said operation by said operation means.

14. The memory interface apparatus according to claim 1, wherein said storage unit stores image data, and said operation is used for filter operation or correlation operation of said image data.

15. The memory interface apparatus according to claim 1, wherein the memory interface apparatus receives said data packet in a time series order according to a scanning order of said image, and said address is assigned to said received data packet in an input time series order.

16. The memory interface apparatus according to claim 1, wherein said memory interface apparatus is provided in a data driven processor.

17. The memory interface apparatus according to claim 1, further comprising offset determining means for controlling whether said address of said received data packet is modified based on said plurality of offsets or said data of said received data packet.

18. A memory interface apparatus, comprising:

an access unit responsive to reception of a data packet including at least one operation code, an address and data for accessing a plurality of prescribed addresses of a storage unit; and a processing unit, wherein
said access unit includes
storage unit address modifying device having a plurality of offset memories for pre-storing a plurality of offsets, and according to one of said at least one operation code in said received data packet, reading said offset from each of said plurality of offset memories based on said data of said received data packet and modifying said address of said received data packet using said plurality of offsets which have been read or modifying said address of said received data packet using said data of said received data packet, and outputting said plurality of prescribed addresses based on a result of said modification, and
storage unit accessing device for accessing, according to said one operation code of said received data packet, said plurality of prescribed addresses of said storage unit output from said storage unit address modifying device, and
said processing unit includes operation device for performing, according to said one operation code of said received data packet, operation of a result of access to said plurality of prescribed addresses by said storage unit accessing device and said data of said received data packet.

19. The memory interface apparatus according to claim 18, wherein the storage unit address modifying device controls whether said address of said received data packet is modified based on said plurality of offsets or said data of said received data packet.

20. A method of using a memory interface apparatus, comprising the steps of:

pre-storing a table having a plurality of offsets in a plurality of offset memories according to one of at least one operation code in the received data packet;

reading an offset from each of the plurality of offset memories based on the data of the received data packet;

modifying an address of the received data packet using one of the plurality of offsets which have been read and data of the received data packet;

outputting a plurality of prescribed addresses based on the result of the modification;

accessing, according to the one operation code of the received data packet;

the plurality of prescribed addresses of the storage unit output from step (d);

(f) performing, according to the one operation code of the received data packet, operation of a result of access to the plurality of prescribed addresses and the data of the received data packet.

21. The method of claim 20, further comprising controlling whether said address of said received data packet is modified based on said plurality of offsets or said data of said received data packet.

* * * * *